United States Patent
Fu et al.

(10) Patent No.: US 10,614,379 B2
(45) Date of Patent: Apr. 7, 2020

(54) ROBUST CLASSIFICATION BY PRE-CONDITIONED LASSO AND TRANSDUCTIVE DIFFUSION COMPONENT ANALYSIS

(71) Applicant: Disney Enterprises, Inc., Burbank, CA (US)

(72) Inventors: Yanwei Fu, Pittsburgh, PA (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 664 days.

(21) Appl. No.: 15/277,862

(22) Filed: Sep. 27, 2016

(65) Prior Publication Data

US 2018/0089580 A1 Mar. 29, 2018

(51) Int. Cl.
| | | |
|---|---|---|
| *G06N 20/00* | (2019.01) | |
| *G06F 16/51* | (2019.01) | |
| *G06F 16/28* | (2019.01) | |
| *G06F 16/901* | (2019.01) | |
| *G06F 16/583* | (2019.01) | |

(52) U.S. Cl.
CPC ........... *G06N 20/00* (2019.01); *G06F 16/285* (2019.01); *G06F 16/51* (2019.01); *G06F 16/583* (2019.01); *G06F 16/9024* (2019.01)

(58) Field of Classification Search
CPC ...... G06N 20/00; G06N 7/005; G06F 16/285; G06F 16/583; G06F 16/51; G06F 16/9024
See application file for complete search history.

(56) References Cited

U.S. PATENT DOCUMENTS

| | | | | |
|---|---|---|---|---|
| 9,436,760 | B1 * | 9/2016 | Tacchi | G06F 16/367 |
| 2013/0024141 | A1 * | 1/2013 | Marwah | G06Q 10/04 |
| | | | | 702/61 |
| 2015/0227591 | A1 * | 8/2015 | Jose | G06F 16/285 |
| | | | | 707/777 |
| 2017/0140248 | A1 * | 5/2017 | Wang | G06N 3/0454 |

OTHER PUBLICATIONS

Liu et al., "Robust Multi-Class Transductive Learning with Graphs," IEEE Conf. Comp. Vision and Pattern Recognition, Jun. 20-25, 2009, pp. 381-388. (Year: 2009).*
Fu et al., "Robust Classification by Pre-conditioned LASSO and Transductive Diffusion Component Analysis," in arXiv preprint arXiv:1511.06340 (2015). (Year: 2015).*

(Continued)

*Primary Examiner* — Kamran Afshar
*Assistant Examiner* — Ryan C Vaughn
(74) *Attorney, Agent, or Firm* — Patterson + Sheridan, LLP

(57) ABSTRACT

Techniques are disclosed for identifying and filtering outliers from a sample set of data prior to training a classifier on an object using the sample set. A data set including a plurality of samples used to train a classification model is retrieved. The samples in the data set have a feature dimensionality. A graph of the data set is built. Each node in the graph corresponds to a sample in the data set and edges connecting the nodes correspond to a measure of similarity between the nodes. The feature dimensionality of the sample data set is reduced based on a topology of the graph. One or more outliers in the data set are identified based on the reduced feature dimensionality.

20 Claims, 5 Drawing Sheets

(56) References Cited

OTHER PUBLICATIONS

M. Bamnl, M. Tapaswi, and R. Stiefelhagen. Semi-supervised learning with constraints for person identification in multimedia data. In CVPR, 2013.
T. Berg and D. Forsyth. Animals on the web. In CVPR, 2006.
X. Chen, A. Shrivastava, and A. Gupta. Neil: Extracting visual knowledge from web data. In !CCV, 2013.
H. Cho, B. Berger, and J. Peng. Diffusion component analysis: Unraveling functional topology in biological networks. In Annual International Conference on Research in Computational Molecular Biology. 2015.
B. Collins, J. Deng, K. Li, and L. Fei-Fei. Towards scalable dataset construction: An active learning approach. In ECCV, 2008.
J. Fan, R. Tang, and X. Shi. Partial consistency with sparse incidental parameters. arXiv:1210.6950, 2012.
J. Deng, W. Dong, R. Socher, L.-J. Li, K. Li, and L. Fei-Fei Imagenet: A large-scale hierarchical image database. In CVPR, 2009.
M. Everingham, J. Sivic, and A. Zisserman. "Hello! My name is . . . Buffy"—automatic naming of characters in TV video. In BMVC, 2006.
J. Fan and R. Li. Variable selection via nonconcave penalized likelihood and its oracle properties. JASA, 2001.
R. Fergus, L. Fei-Fei, P. Perona, and A. Zisserman. Learning object categories from google's image search. In /CCV, 2005.
R. Fergus, L. Fei-Fei, P. Perona, and A. Zisserman. Learning object categories from internet image searches. Proceedings of the IEEE, 98(8):1453-1466.
R. Fergus, P. Perona, and A. Zisserman. A visual category filter for goolge images. In ECCV, 2004.
I. Gannaz. Robust estimation and wavelet thresholding in partial linear models. Stat. Comput., 17:293-310,2007.
S. Lafon and A. B. Lee. Diffusion maps and coarse-graining: A unified framework for dimensionality reduction, graph partitioning, and data set parameterization. IEEE TPAMI, 2006.
L.-J. Li, G. Wang, and null Li Fei-Fei. Optimol: automatic online picture collection via incremental model learning. In CVPR, 2007.
T. Lin, M. Maire, S. Belongie, J. Hays, P. Perona, D. Ramanan, P. Dollar, and C. L. Zitnick. Microsoft coco: Common objects in context. In ECCV, 2014.
S. Roweis and L. Saul. Nonlinear dimensionality reduction by locally linear embedding. Science, 2000.
P. Sermanet, D. Eigen, X. Zhang, M. Mathieu, R. Fergus, and Y. LeCun. Overfeat: Integrated recognition, localization and detection using convolutional networks. In ICLR, 2014.
Y. Fu, T. M. Hospedales, T. Xiang, S. Gong, andY. Yao. Interestingness prediction by robust learning to rank. InECCV, 2014.
K. Simonyan, 0. M. Parkhi, A. Vedaldi, and A. Zisserman. Fisher Vector Faces in the Wild. In British Machine Vision Conference, 2013.
Y. Fu, T. M. Hospedales, T. Xiang, J. Xiong, S. Gong, Y. Wang, andY. Yao. Robust subjective visual property prediction from crowdsourced pairwise labels. In arxiv. 2015.
M. J. Wainwright. Sharp thresholds for high-dimensional and noisy sparsity recovery using l1-constrained quadratic programming (lasso). IEEE Transactions on Information Theory, 2009.
P. Zhao and B. Yu. On model selection consistency of lasso. In JMLR. 2006.
X. Zhu. Semi-supervised learning literature survey. Technical Report 1530, University of WisconsinMadison Department of Computer Science, 2007.
J. Neyman and E. L. Scott. Consistent estimates based on partially consistent observations, 1948.
F. Schroff, A. Criminisi, and A. Zisserman. Harvesting image databases from the web. In /CCV, 2007.
Y. She and A. B. Owen. Outlier detection using nonconvex penalized regression. Journal of American Statistical Association, 2011.
M. Tapaswi, M. Bauml, and R. Stiefelhagen. Storygraphs: visualizing character interactions as a timeline. In CVPR, 2014.
F. L. Wauthier, N. Jojic, and M. I. Jordan. A comparative framework for preconditioned lasso algorithms. In NIPS, 2013.
Zhou et al, "Learning with Local and Global Consistency," In NIPS. 2003, 8 pages.

\* cited by examiner

ROBUST CLASSIFICATION BY PRE-CONDITIONED LASSO AND TRANSDUCTIVE DIFFUSION COMPONENT ANALYSIS

BACKGROUND

Field

Embodiments presented herein generally relate to data classification (e.g., image classification, audio classification, etc.), and more specifically, to identifying and filtering outliers from a data set.

Description of the Related Art

Many modern computer data recognition approaches use supervised learning techniques that rely on a large set of labeled data to train classification models. Such data sets have been collected from the web by searching for query terms relevant to a particular object label and verifying consistency through crowdsourced labeling, i.e., soliciting verification of the label to a data set from a large group of people. Such an approach is often costly and difficult to scale. For example, image data sets often include multiple labels, and each image in the set needs to be verified or labeled by a group of individual annotators.

To address such difficulties of image data sets, automated methods may collect, cluster and annotate the images based on characteristics or features found in the images. The annotated clusters can be used to train a classifier to recognize one or more objects in subsequently presented example images where examples of that object appeared in the annotated clusters on a given image-based object (i.e., an object that appears in the image). However, the resulting annotated clusters tend to include a number of outliers, i.e., images that do not correspond to an instance of the object associated with the cluster. For example, given a collection of images collected from a search of images on the web in response to a text query for a particular actor, outliers would include images that are not an instance of that actor (though may be tangentially related to that actor), such as images of the actor's spouse, images of products that the actor promotes, and images of co-stars of actors from different films. The presence of outliers in a trained set of images can significantly confuse recognition techniques when building the classifier and affect overall system performance. Therefore, it is desirable to remove such outliers.

SUMMARY

One embodiment presented herein discloses a method. This method generally includes retrieving a data set including a plurality of samples used to train a classification model. The samples in the data set have a feature dimensionality. The method also generally includes building, by operation of a processor executing one or more applications, a graph data structure of the data set. Each node in the graph data structure corresponds to a sample in the data set. An edge connecting a first and second node in the graph data structure corresponds to a measure of similarity between the first and second node. The feature dimensionality of the sample data set is reduced based on a topology of the graph data structure. One or more outliers in the plurality of samples are identified based on the reduced feature dimensionality.

Another embodiment presented herein discloses a non-transitory computer-readable storage medium storing instructions. The instructions, when executed on a processor, perform an operation. The operation itself generally includes retrieving a data set including a plurality of samples used to train a classification model. The samples in the data set have a feature dimensionality. The operation also generally includes building, by operation of a processor executing one or more applications, a graph data structure of the data set. Each node in the graph data structure corresponds to a sample in the data set. An edge connecting a first and second node in the graph data structure corresponds to a measure of similarity between the first and second node. The feature dimensionality of the sample data set is reduced based on a topology of the graph data structure. One or more outliers in the plurality of samples are identified based on the reduced feature dimensionality.

Yet another embodiment presented herein discloses a system having a processor and a memory. The memory stores program code, which, when executed on a processor, performs an operation. The operation itself generally includes retrieving a data set including a plurality of samples used to train a classification model. The samples in the data set have a feature dimensionality. The operation also generally includes building, by operation of a processor executing one or more applications, a graph data structure of the data set. Each node in the graph data structure corresponds to a sample in the data set. An edge connecting a first and second node in the graph data structure corresponds to a measure of similarity between the first and second node. The feature dimensionality of the sample data set is reduced based on a topology of the graph data structure. One or more outliers in the plurality of samples are identified based on the reduced feature dimensionality.

BRIEF DESCRIPTION OF THE DRAWINGS

So that the manner in which the above recited aspects are attained and can be understood in detail, a more particular description of embodiments presented herein, briefly summarized above, may be had by reference to the appended drawings.

Note, however, that the appended drawings illustrate only typical embodiments of the present disclosure and are therefore not to be considered limiting of its scope.

DETAILED DESCRIPTION

Figure 1:
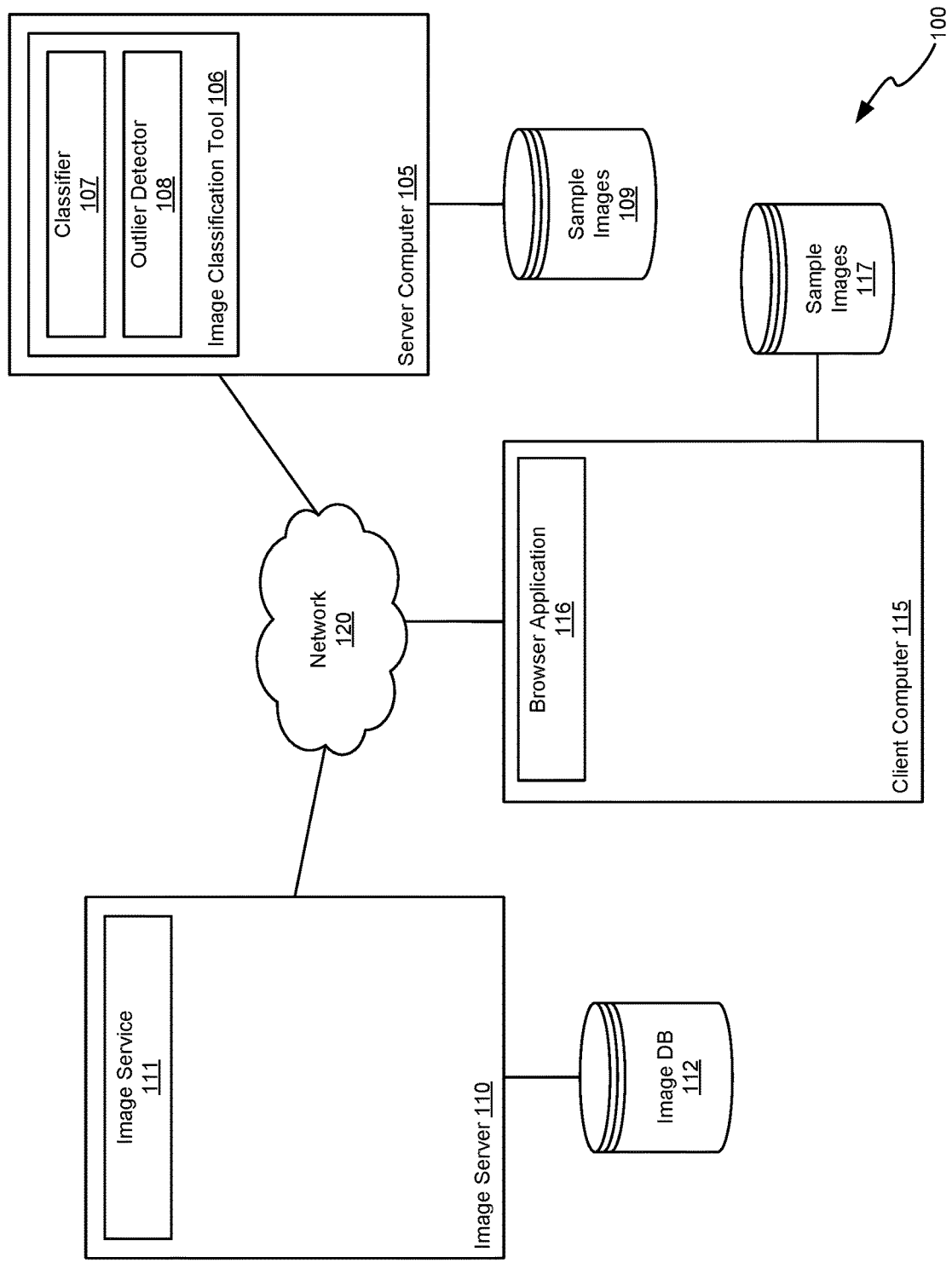
FIG. 1 illustrates an example computing environment, according to one embodiment.

Embodiments presented herein disclose techniques for detecting outliers in a sample set of data, such as images, prior to training a classifier on a given image-based object (i.e., an object that is present in the images). In one embodiment, software processes such as an application detect and filter outliers (i.e., images that do not depict the object) from the sample data set by assigning each image in the data set a variable having a value that weights a contribution of the image to the sample set. Based on the value of that variable for a given image, the application may eliminate the image from the sample set.

Images within the sample set are represented by a large variety of features that can be used to assess and distinguish between inliers (i.e., images that are desired within the set of data) and outliers (i.e., images that are not desired within the data set). This large variety of features having a high-dimension feature space can be computationally expensive to process. To determine the value of the variable to associate with each image, it is desirable to reduce the dimensionality of the sample set. In one embodiment, a graph-based dimensionality reduction approach, such as transductive diffusion component analysis (TDCA) or comparable analytical technique for obtaining informative dimensional reduction, is used for feature dimension reduction. TDCA provides a manifold-aware dimensionality reduction technique that is robust towards outlier data. In such an approach, a graph data structure is constructed with nodes corresponding to training data in the sample image set. A topological structure of the sample image set may be modeled by performing a lazy random walk of the graph. Doing so allows the application to generate a low dimension feature set.

In one embodiment, the application uses the low dimension feature set as input to a pre-conditioned LASSO algorithm, which detects instances of noise in each image of the set. Doing so results in a subset of the images being identified as having a relatively high variance from other images in the data set. The application determines such images to be outliers and subsequently filters the subset from the sample set. The resulting sample set is then used as input to machine learning-based classification approaches to build classifiers.

Advantageously, explicitly detecting and filtering outliers from a sample image set provides more robust classifiers. For instance, a wider range of classification approaches that are less tolerant to image outliers may be used more effectively in the absence of the outliers. Further, using a feature reduction approach (such as TDCA) on the sample image set reduces negative effects of data bias between labeled and unlabeled data in a given sample set through a diffusion map on the transductive graph and an approximation of inferring comparable node features, thereby decreasing the likelihood of false positives in detecting outliers.

The following example uses a sample set of images collected from a query-based search as a reference example of data used in machine learning-based object classification, particularly in detecting noise and outlier images from the set that do not correspond to a true instance of a given object to be classified. However, one of skill in the art will recognize that embodiments presented herein may be adapted to a variety of digital media, such as audio files, video files, and the like. For example, an application may detect outliers in a sample set of audio files for building a classifier used to detect the presence of a voice of a given individual. The application may construct a node graph based on the sample audio data that can be used to reduce feature dimensionality of each sample. Doing so allows the application to more efficiently perform outlier analysis, e.g., via a pre-conditioned LASSO technique, and subsequently filter outliers from the sample audio data set.

FIG. 1 illustrates an example computing environment, according to one embodiment. As shown, computing environment 100 includes a server computer 105, an image server 110, and a client computer 115, each connected via a network 120 (e.g., the Internet). In one embodiment, the server computer 105 represents a physical computing system, e.g., a desktop system, a laptop computer, or workstation computer. The server computer 105 may also be a virtual computing instance in a cloud computing environment.

As shown, the server computer 105 includes an image classification tool 106. The image classification tool 106 itself includes a classifier 107 and an outlier detector 108. Generally, the image classification tool 106 trains a given classifier 107 to detect an instance of an object by training a model built from performing machine learning techniques on sample images 109 corresponding to the object and/or in which the object appears. The sample images 109 can be obtained from a web-based image server 110 that the server computer 105 may access via image service 111. The image service 111 may retrieve, from an image database (DB) 112, the sample images 109 in response to a web-based query by the image classification tool 106. In addition, the sample images 109 may also be uploaded to the image classification tool 106. For example, a user may upload a set of sample images 117 via a browser application 116 executing on the client computer 115. Typically, the sample images 109 are automatically retrieved and annotated so that the image classification tool 106 can build learning models to train the classifier 107 using the sample images 109. However, because the sample images 109 are automatically collected, it is possible that a number of outlier images (i.e., images that do not actually correspond to the object) exist in the set of sample images 109.

For example, assume that the image classification tool 106 retrieves sample images 109 from the image service 111 for training a classifier 107 to recognize an instance of a particular actor within each of the images 109. To do so, the image classification tool 106 may submit a web-based query including the name of that actor, and in response, the image service 111 returns the sample images 109 corresponding to that query. While the sample images 109 will include images that have an instance of the actor, a number of the images 109 may include images that do not—e.g., images of the actor's wife, co-stars, products promoted by the actor, etc. Such images are considered outliers. Although outliers in such data sets are presumed to be rare, the presence of outliers can render the resulting trained models less accurate and also affect the overall performance of recognition techniques when filtering out outliers during a classification phase.

Figure 2:
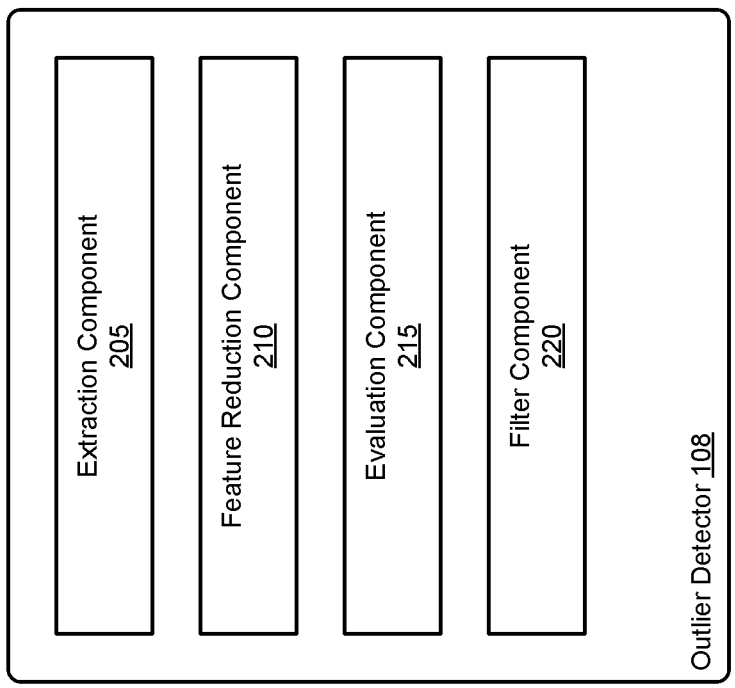
FIG. 2 further illustrates the outlier detector described relative to FIG. 1, according to one embodiment.

In one embodiment, the outlier detector 108 identifies outlier images from the sample images 109. Once identified, the outlier detector 108 explicitly filters outlier images from the sample images 109 prior to the image classification tool 106 training the classifier 107 on an object. FIG. 2 further illustrates the outlier detector 108, according to one embodiment. In particular, FIG. 2 presents a conceptual diagram of the process steps performed by the outliner detector 108. One of skill in the art will recognize that the actual allocation of process steps in practice may vary substantially from this illustration. As shown, outlier detector 108 includes an extraction component 205, a feature reduction component 210, an evaluation component 215, and a filter component 220.

The extraction component 205 retrieves sample images 109. Such sample images 109 may be retrieved from any variety of sources. For example, the extraction component 205 may perform a query corresponding to the object to a web-based image service, e.g., image service 111. As another example, the sample images 109 may be retrieved from an image database. The sample images may include labeled images (i.e., images that are annotated with metadata) and unlabeled images. Once retrieved, the extraction component 205 may identify any metadata associated with each image and normalize the images to a common format (e.g., a GIF, PNG, or JPEG format). The extraction component 205 outputs the sample images 109 and associated metadata to the feature reduction component 210.

The feature reduction component 210 determines a low-level feature subset from the sample image set allowing outliers to be identified in the sample set more effectively. Low-level features typically correspond to features of the image such as edges, corners, lines, and so on, of an image. The low-level feature subset may include such features found in common in the sample image set. In one embodiment, the feature reduction component 210 performs transductive diffusion component analysis (TDCA) over the sample set.

The filter component 220 removes the images determined as outliers from the set of sample images and returns the resulting set to the image classification tool 106, which, in turn, performs a classification technique on the sample set of images, e.g., training a model using the images so that subsequently observed images are evaluated over whether a given image includes that object. The classification technique can include methods that are less tolerant towards image outliers, which are better able to recognize objects in the absence of outliers. Examples of image classification techniques that are less tolerant towards outliers include logical regression image classification methods and general machine learning approaches. The classification technique can also be adapted to methods that are more tolerant towards image outliers, such as random forest algorithms.

Figure 3:
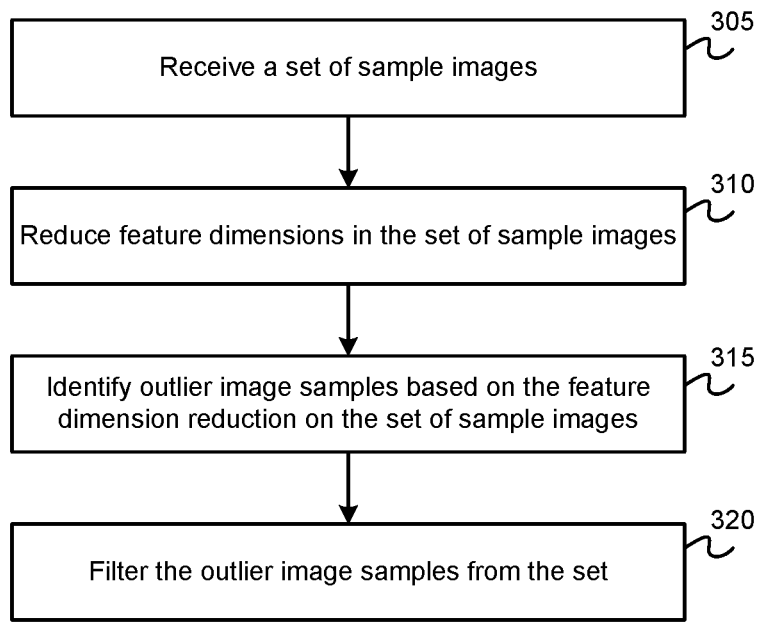
FIG. 3 illustrates a method for filtering outliers from a sample set of data, according to one embodiment.

FIG. 3 illustrates a method 300 for filtering outliers from a sample set of data, according to one embodiment. In step 305, a set of sample images is received. For example, the sample images may be returned in response to a query for a particular actor.

At step 310, the feature dimensions in the sample image set are reduced, e.g., using a graph-based feature dimension reduction technique, such as TDCA. At step 315, outlier image samples are detected using the reduced feature-dimension on the set of sample images. In particular, the evaluation component 215 uses the reduced low-level feature set as input for a pre-conditioned LASSO technique. The sample images may be ordered based on the likelihood that the image is an outlier. The images may optionally be grouped by order, and the subset having the highest likelihood of containing outliers is determined. At step 320, the sample images that are determined to be outliers are removed from the set. The filter component 220 removes the images determined as outliers from the sample set. The filter component then outputs the resulting sample set to the image classification tool 106.

Figure 4:
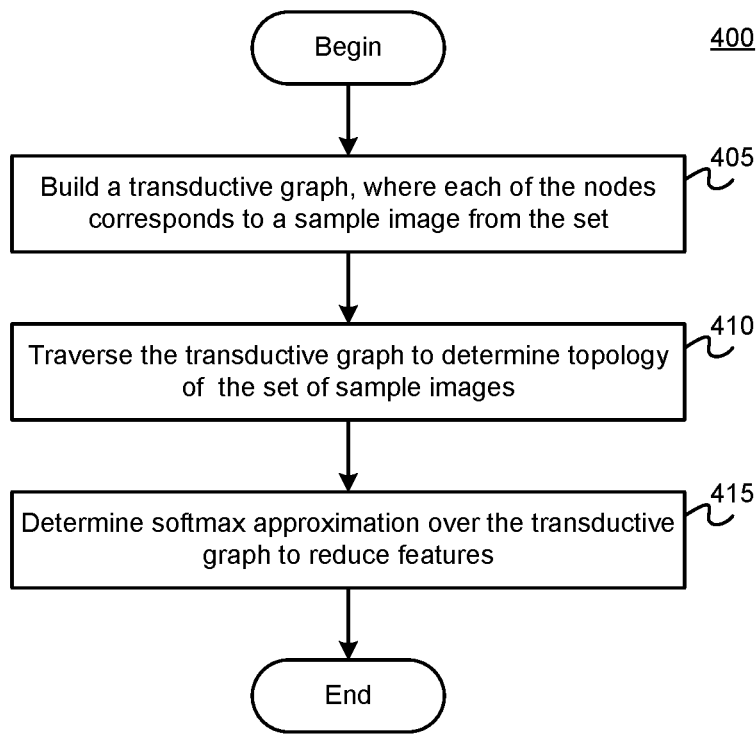
FIG. 4 illustrates a method for reducing feature dimensions in a sample set of images.

FIG. 4 illustrates a method 400 for reducing feature dimensions in a sample set of images. In particular, method 400 represents a TDCA feature reduction on the sample set of images, e.g., as described relative to FIG. 3. As shown, method 400 begins at step 405, where a transductive graph is built from each of the sample set of images. Each node of the transductive graph corresponds to a sample image from the set.

In one embodiment, the feature reduction component 210 constructs a graph with nodes corresponding to training images in the sample set. Assuming that $\psi_k$ and it are original low-level features of nodes k and l in the graph, a similarity weight between the two nodes can be defined as:

$$\omega(\psi_k, \psi_l) = \exp\left(\frac{\langle\psi_k, \psi_l\rangle^2}{\delta}\right), \quad (1)$$

where $\langle\psi_k,\psi_l\rangle^2$ is the square of the inner product of features of nodes k and l with a free parameter $\delta=\text{median}_{k,l=1,\ldots,n}\langle\psi_k,\psi_l\rangle^2$. In one embodiment, the graph is a k-nearest-neighbor graph, which provides computational efficiency. This results in graph=(V,E). The transition probability of instances k and l is thus defined as, $$P_{kl} = \frac{\omega(\psi_k, \psi_l)}{\sum_m \omega(\psi_k, \psi_m)}, \quad (2)$$

where the sum over the k-nearest-neighbor set of k and l is also within the set.

At step 410, the transductive graph is traversed to determine topology of the set of sample images. The feature reduction component 210 performs a random walk over the constructed graph to discover a topology of the graph and a similarity distribution between nodes. In one embodiment, the feature reduction component 210 performs a lazy random walk to achieve convergence to the stationary distribution. The lazy random walk from node k may be defined as:

$$s_k^{t+1} = (1-p_r)s_k^{t+1}P + p_r e_k \quad (3),$$

where $e_k(k)=1$, and $e_k(l)=0 \forall k \neq l$. Further, $p_r$ is a restart probability that balances the influence of local and global topological information in diffusion. In practice, $p_r$ may be set to 0.5, although other values between 0 and 1 can be used, where a higher restart probability indicates that the lazy random walk will restart at a given node (and thus result in a larger reduction). $s_k^{t+1}$ represents a diffusion state of node k at the t-th step, and thus, the diffusion state for node k is:

$$s_k^{t+1} = s_k^\infty \quad (4).$$

The lazy random walk allows the feature reduction component to determine a diffusion state for each node. However, because outlier images cause missing or spurious interactions in the graph, the outliers may negatively impact the lazy random walk.

To reduce the influence of the outliers, at step 415, a softmax approximation over the transductive graph is determined. In doing so, the feature reduction component 210 reduces a given high dimensional low-level feature into a low-dimensional feature set for each node. In one embodiment, the feature reduction component 210 may perform the softmax normalization to reduce the influence of outliers in the sample images. In particular, the feature reduction component 210 approximates a probability assigned to node l in the diffusion state of node k:

$$\hat{s}_{kl} = \frac{\exp\{w_k^T x_l\}}{\sum_{l'} \exp\{w_k^T x_{l'}\}}, \quad (5)$$

where node k is presented as two vector representations $w_k$ and $x_k$, which model topological structures of node k. Further, $x_k$ represents features of the image associated with the node k (e.g., edges, corners, and the like). Further still, $w_k$ represents context features (e.g., co-occurrences of low-level features between a given image and another image)

that capture connections of node k to other nodes. The feature reduction component 210 may determine $w_k$ and $x_k$ using an optimization problem:

$$\min_{w,x} C(s, \hat{s}) = \frac{1}{n}\sum_{i=1}^{n} D_{KL}(s_{kl}\|\hat{s}_{kl}), \quad (6)$$

where $D_{KL}$ represents a convergence (relative entropy) that is used as an objective function. Other stochastic search techniques may also be applied as an objective function (e.g., cross-entropy method, random search, and the like).

As a result, for each node instance k (which corresponds to an image in the set), the feature reduction component 210 reduces an original high dimensional low-level feature $\psi_k$ into a low dimensional feature set $\{w_k, x_k\}$. For undirected graphs, $w_i$ and $x_{ki}$ are relatively close in direction with one another (in the sense of cosine similarity) to capture fine-grained topological structures that can be used in classification. For purposes of description, the resulting low-level feature set is represented herein as $\Phi = \{x_i^T\}_{i=1}^n$.

The evaluation component 215 may then use the low-dimensional feature set as input for a pre-conditioned LASSO technique. The evaluation component 215 identifies outliers in the input set of sample images using a pre-conditioned LASSO (least absolute shrinkage and selection operator) technique on the sample set. The evaluation component 215 associates an outlier variable γ with each of the sample images. In particular, the evaluation component 215 assumes the presence of outliers in the sample image set but also assumes that the outliers are sparse, which leads to a problem formation:

$$\min \tfrac{1}{2}\|y-\Phi\beta-\gamma\|_2^2 + \lambda\|\gamma\|_1 \quad (7),$$

which subtracts a sparse set of outliers from the sample data and assumes an ordinary least square (OLS) estimate for remaining inlier images. Taking a Lagrangian $L(\beta,\gamma) = \tfrac{1}{2}\|y-\Phi\beta-\gamma\|_2^2 + \lambda\|\gamma\|_1$ and setting $$\frac{\partial L}{\partial B} = 0$$

results in:

$$\hat{\beta} = (\Phi^T\Phi)^\dagger \Phi^T(y-\gamma) \quad (8).$$

And by inserting equation (8) into equation (7), the evaluation component 215 can configure the LASSO technique for the outlier variable γ:

$$\hat{\gamma} = \operatorname{argmin} \tfrac{1}{2}\|y - \Phi(\Phi^T\Phi)^\dagger\Phi^T(y-\gamma) - \gamma\|_2^2 + \lambda\|\gamma\|_1 \quad (9).$$

A hat matrix $H = \Phi(\Phi^T\Phi)^\dagger\Phi^T$ represents a symmetric and idempotent matrix. As a result, equation 9 may be simplified as:

$$\hat{\gamma} = \operatorname{argmin} \tfrac{1}{2}\|\tilde{y} - \tilde{X}\gamma\|_2^2 + \lambda\|\gamma\|_1 \quad (10),$$

where $\tilde{X} = (I-H)$, $\tilde{y} = \tilde{X}y$, and I is an identity matrix; λ controls the amount of regularization on γ. For instance, λ=0 simplifies to an OLS problem, while λ=∞ shrinks all γ to 0. Equation 10 allows the evaluation component 215 to order training instances by λ, that is, the likelihood that a given sample image is an outlier. More specifically, the evaluation component 215 determines a regularization path of LASSO when λ is changed from ∞ to 0. The LASSO technique selects a variable subset accounting for the highest variances to the observations. Further, the evaluation component 215 assigns nonzero elements in equation (10), resulting in the subset has having a higher likelihood of being an outlier. The evaluation component 215 then optionally orders the samples by evaluating a non-zero γ when λ is changed from ∞ to 0. Under this approach, the evaluation component 215 may determine the top subset to be outliers.

Figure 5:
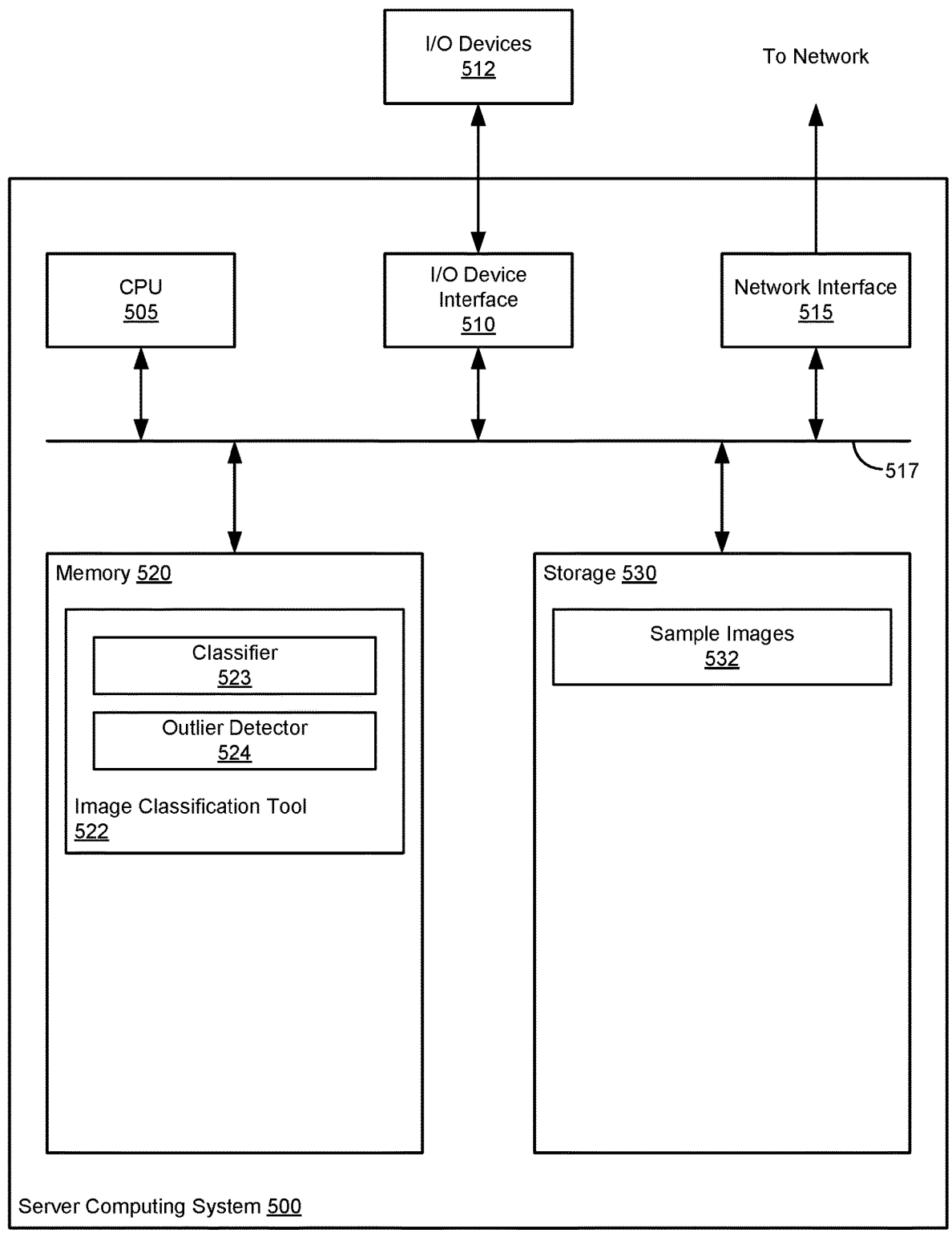
FIG. 5 illustrates an example computing system configured to filter outliers from a sample set of data, according to one embodiment.

FIG. 5 illustrates an example computing system 500 configured to filter outliers from a sample set of data, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the server computing system 500. The computing elements shown in server computing system 500 may correspond to a physical computing system or may be a virtual computing instance executing within a computing cloud.

The CPU 505 retrieves and executes programming instructions stored in the memory 520 as well as stores and retrieves application data residing in the storage 530. The interconnect 517 is used to transmit programming instructions and application data between the CPU 505, I/O devices interface 510, storage 530, network interface 515, and memory 520. CPU 505 is representative of a single CPU, multiple CPUs, a single CPU having multiple processing cores, and the like. The memory 520 is representative of a random access memory. The storage 530 may be a disk drive or solid state storage device. Although shown as a single unit, the storage 530 may be a combination of fixed and/or removable storage devices, such as fixed disc drives, removable memory cards, or optical storage, network attached storage (NAS), or a storage area-network (SAN).

The memory 520 includes an image classification tool 522. The storage 530 includes sample images 532 retrieved, e.g., in response to a query to a web-based image service for a particular object. The image classification tool 522 itself includes one or more classifiers 523 and an outlier detector 524. Generally, the image classification tool 522 builds a classifier 523 from a set of sample images 532 corresponding to a given object. The sample images 532 themselves may include one or more outlier images that do not correspond to a true instance of the object.

In one embodiment, the outlier detector 524 explicitly filters outlier images from the sample images 532 to improve classification techniques used by the image classification tool. The outlier detector 524 eliminates identified outlier images from the sample images 532, thus allowing the image classification tool 522 to more effectively build the classifier 523.

In the preceding description, reference is made to embodiments of the present disclosure. However, the present disclosure is not limited to specific described embodiments. Instead, any combination of the preceding features and elements, whether related to different embodiments or not, is contemplated to implement and practice the present disclosure. Furthermore, although embodiments presented herein may achieve advantages over other possible solutions and/or over the prior art, whether or not a particular advantage is achieved by a given embodiment is not limiting. Thus, the preceding aspects, features, embodiments and advantages are merely illustrative and are not considered elements or limitations of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "system." Furthermore, aspects of the present disclosure may take the form of a computer program product embodied in one or more computer readable medium(s) having computer readable program code embodied thereon. Any combination of one or more tangible computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A computer-implemented method of outlier detection and removal for classifier training, the computer-implemented method comprising:
   retrieving a data set including a plurality of samples used to train a classification model, wherein the samples in the data set have an original feature dimensionality;
   building a graph data structure of the data set, the graph data structure comprising a transductive graph that is a k-nearest-neighbor graph having a plurality of nodes, each node of which corresponds to a respective sample of the plurality of samples, wherein an edge connecting first and second nodes of the plurality of nodes corresponds to a measure of similarity between the first and second nodes, wherein building the graph data structure comprises defining a similarity weight between nodes as a function of an inner product of a plurality of features of the nodes with a free parameter;
   determining, by operation of one or more computer processors, a reduced feature dimensionality, relative to the original feature dimensionality, of the data set using a transductive diffusion component analysis over the plurality of nodes of the graph data structure, wherein determining the reduced feature dimensionality of the data set includes determining a softmax approximation over the transductive graph;
   identifying, based on the reduced feature dimensionality, one or more outliers in the plurality of samples using a pre-conditioned least absolute shrinkage and selection operator, wherein the one or more outliers are identified based on a determined regularization path of the least absolute shrinkage and selection operator;
   modifying the plurality of samples by removing the identified one or more outliers from the plurality of samples;
   training the classification model on an inlier object using the modified plurality of samples; and
   classifying the inlier object using the trained classification model.

2. The computer-implemented method of claim 1, wherein identifying the one or more outliers comprises:
   ordering the plurality of samples according to a likelihood that the sample is an outlier based on the reduced feature dimensionality.

3. The computer-implemented method of claim 1, wherein the classification model is trained to identify the inlier object and wherein each outlier does not correspond to an instance of the inlier object.

4. The computer-implemented method of claim 1, wherein the data set is retrieved from a web-based image service.

5. The computer-implemented method of claim 4, wherein the web-based image service labels each sample in the data set with an indication referencing the inlier object.

6. The computer-implemented method of claim 1, wherein the computer-implemented method is performed by an image classification tool that includes a classifier and an outlier detector, the classifier comprising the classification model;
   wherein the outlier detector is configured to identify and remove the one or more outliers from the plurality of samples;
   wherein the classifier is configured to classify the inlier object;
   wherein the outlier detector includes a plurality of components including an extraction component, a feature reduction component, an evaluation component, and a filter component;
   wherein the extraction component is configured to retrieve the data set including the plurality of samples;
   wherein the feature reduction component is configured to determine the reduced feature dimensionality of the data set;
   wherein the evaluation component is configured to identify the one or more outliers in the plurality of samples; and
   wherein the filter component is configured to remove the one or more outliers from the plurality of samples.

7. The computer-implemented method of claim 6, wherein the image classification tool is operatively connected, via a network, to a web-based image service and to a browser application;
   wherein the data set is retrieved from the web-based image service and the browser application;

wherein the image classification tool, the image service, and the browser application each execute on a respective, distinct computer of a plurality of computers;

wherein the web-based image service is configured to label each sample in the data set with an indication referencing the inlier object; and wherein each sample comprises a respective, graphical image.

8. The computer-implemented method of claim 1, wherein the computer-implemented method is performed by an image classification tool, the image classification tool including the classification model and an outlier detector.

9. A non-transitory computer-readable medium storing instructions executable to perform an operation of outlier detection and removal for classifier training, the operation comprising:

retrieving a data set including a plurality of samples used to train a classification model, wherein the samples in the data set have an original feature dimensionality;

building a graph data structure of the data set, the graph data structure comprising a transductive graph that is a k-nearest-neighbor graph having a plurality of nodes, each node of which corresponds to a sample of the plurality of samples, wherein an edge connecting first and second nodes of the plurality of nodes corresponds to a measure of similarity between the first and second nodes, wherein building the graph data structure comprises defining a similarity weight between nodes as a function of an inner product of a plurality of features of the nodes with a free parameter;

determining, by operation of one or more computer processor when executing the instructions, a reduced feature dimensionality, relative to the original feature dimensionality, of the data set using a transductive diffusion component analysis over the plurality of nodes of the graph data structure, wherein determining the reduced feature dimensionality of the data set includes determining a softmax approximation over the transductive graph; and identifying, based on the reduced feature dimensionality, one or more outliers in the plurality of samples using a pre-conditioned least absolute shrinkage and selection operator, wherein the one or more outliers are identified based on a determined regularization path of the least absolute shrinkage and selection operator;

modifying the plurality of samples by removing the identified one or more outliers from the plurality of samples;

training the classification model on an inlier object using the modified plurality of samples; and classifying the inlier object using the trained classification model.

10. The non-transitory computer-readable medium of claim 9, wherein identifying the one or more outliers comprises:

ordering the plurality of samples according to a likelihood that the sample is an outlier based on the reduced feature dimensionality.

11. The non-transitory computer-readable medium of claim 9, wherein the classification model is trained to identify the inlier object and wherein each outlier does not correspond to an instance of the inlier object.

12. The non-transitory computer-readable medium of claim 9, wherein the data set is retrieved from a web-based image service.

13. The non-transitory computer-readable medium of claim 12, wherein the web-based image service labels each sample in the data set with an indication referencing the inlier object.

14. The non-transitory computer-readable medium of claim 9, wherein the operation is performed by an image classification tool, the image classification tool including the classification model and an outlier detector.

15. A system of outlier detection and removal for classifier training, the system comprising:

one or more computer processors; and a memory storing program code which, when executed on the one or more computer processors, performs an operation comprising:

retrieving a data set including a plurality of samples used to train a classification model, wherein the samples in the data set have an original feature dimensionality;

building a graph data structure of the data set, the graph data structure comprising a transductive graph that is a k-nearest-neighbor graph having a plurality of nodes, each node of which corresponds to a respective sample of the plurality of samples, wherein an edge connecting first and second nodes of the plurality of nodes corresponds to a measure of similarity between the first and second nodes, wherein building the graph data structure comprises defining a similarity weight between nodes as a function of an inner product of a plurality of features of the nodes with a free parameter;

determining a reduced feature dimensionality, relative to the original feature dimensionality, of the data set using a transductive diffusion component analysis over the plurality of nodes of the graph data structure, wherein determining the reduced feature dimensionality of the data set includes determining a softmax approximation over the transductive graph; and identifying, based on the reduced feature dimensionality, one or more outliers in the plurality of samples using a pre-conditioned least absolute shrinkage and selection operator, wherein the one or more outliers are identified based on a determined regularization path of the least absolute shrinkage and selection operator;

modifying the plurality of samples by removing the identified one or more outliers from the plurality of samples;

training the classification model on an inlier object using the modified plurality of samples; and classifying the inlier object using the trained classification model.

16. The system of claim 15, wherein identifying the one or more outliers comprises:

ordering the plurality of samples according to a likelihood that the sample is an outlier based on the reduced feature dimensionality.

17. The system of claim 15, wherein the classification model is trained to identify the inlier object and wherein each outlier does not correspond to an instance of the inlier object.

18. The system of claim 15, wherein the data set is retrieved from a web-based image service and wherein the web-based image service labels each sample in the data set with an indication referencing the inlier object.

19. The system of claim 15, wherein the data set is retrieved from a web-based image service.

20. The system of claim 15, wherein the operation is performed by an image classification tool, the image classification tool including the classification model and an outlier detector.

* * * * *